Aug. 24, 1926.
E. E. WILSON
LINK
Filed April 17, 1925
1,597,259
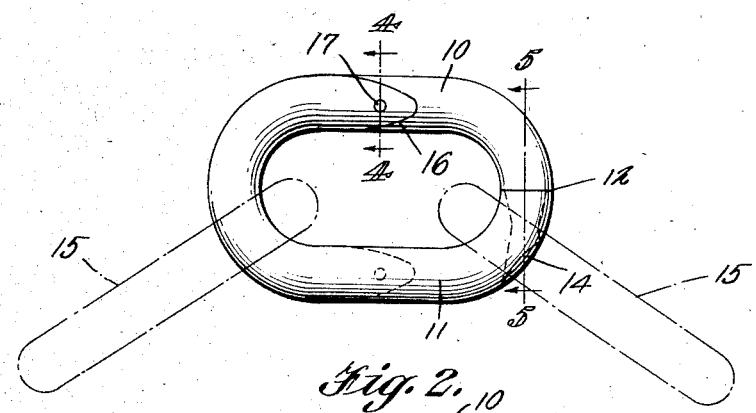
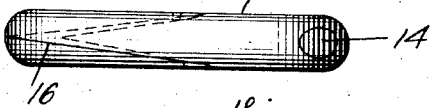
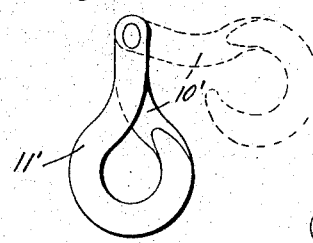
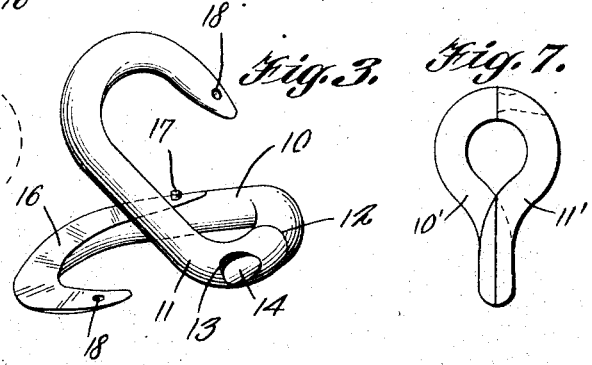
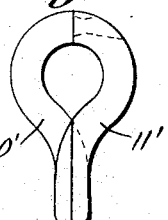
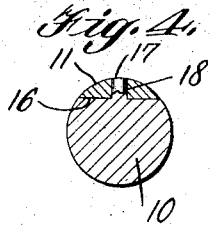
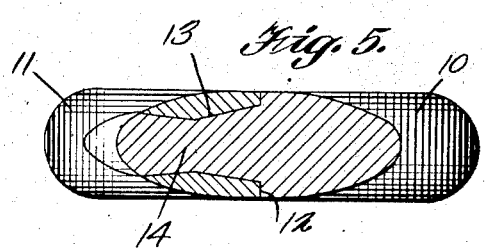
E.E.Wilson, INVENTOR
BY Victor J. Evans
ATTORNEY
WITNESS: P.J.Hickey Patented Aug. 24, 1926.

1,597,259

UNITED STATES PATENT OFFICE.

EARNEST E. WILSON, OF BROOKVILLE, PENNSYLVANIA.

LINK.

Application filed April 17, 1925. Serial No. 23,907.

This invention contemplates the provision of a link for connecting the ends of a chain together, wherever the use of an endless chain is desired, and is particularly advantageous for repairing a broken chain, such as a cross chain for automobile wheels.

More specifically stated, the invention provides a link made up of two hook like members which are connected at one end, by a swivelled joint or hinge to allow the members to be opened for association with a chain, and subsequently arranged one upon the other and held together by the respective members and adapted to be received by openings in the adjacent member.

In the drawing forming part of this application, like numerals of reference indicate similar parts in the several views, and wherein:—

Figure 1 is a plan view of a link showing how it is used to connect the adjacent links of a chain.

Figure 2 is an edge elevation.

Figure 3 is a perspective view showing the link opened.

Figure 4 is a sectional view on line 4—4 of Figure 1.

Figure 5 is a sectional view on line 5—5 of Figure 1.

Figure 6 is a view of a modified construction.

Figure 7 is a view taken at a right angle to Figure 6.

The connecting link forming the subject matter of the present invention comprises a pair of hook like members indicated at 10 and 11 respectively which have their corresponding extremities arranged in end to end relation as at 12. One of these extremities is formed with an opening or bore 13 preferably of the shape shown in Figure 5 to accommodate a pivot or pin extension 14 of similar contour projecting from the adjacent end of the member 10. This provides a swivel or hinged joint between the respective members, so that the link can be opened to facilitate its association with the links 15 of a chain, or its removal from said links as the occasion may require, and subsequently closed as shown in Figure 1. By reason of the construction of the hook like members 10 and 11, it is manifest that the links 15 of the chain are allowed freedom of movement when associated with the connecting link. In other words, each hook like member of the connecting link is tapered as at 16, and when the link is closed, these tapered portions are arranged in face to face contact, so that the link is of uniform diameter throughout. Each hook like member is provided with a pin 17 and an opening 18, the latter being adapted to receive the pin 17 of the adjacent member, while the pin of one member is adapted to be received by the adjacent opening 18 of the other member to hold the said members closed. The invention is very simple in construction, and can be manufactured and sold at a nominal cost. In Figures 6 and 7 I have shown a modified form of the invention, which form consists of a twisted link primarily intended to form part of a cross chain for automobile wheels or the like, the respective members of the link being indicated at 10' and 11' respectively.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:—

A link of the character described comprising a pair of hook-like members having corresponding ends arranged in end to end relation, one of said ends having a bore opening at one side of said member, with the wall of the bore oppositely inclined toward the ends thereof, a reduced extension projecting from the other corresponding end of the adjacent member, and having an outline conforming to the shape of said bore in which said projection is arranged, whereby said hook-like members are hingedly connected together, a shoulder formed by the reduced extension and adapted to be engaged by the adjacent end of the other member, said hook like members having portions reposing one upon the other and tapered to provide a link of uniform thickness throughout when said tapered portions are arranged in face to face contact, pins projecting from the tapered portion of one member, and the corresponding portion of the other member having openings to receive said pins.

In testimony whereof I affix my signature.

EARNEST E. WILSON.